United States Patent

[11] 3,543,792

[72] Inventor Robert F. O'Keefe
 Trumbull, Connecticut
[21] Appl. No. 741,702
[22] Filed July 1, 1968
[45] Patented Dec. 1, 1970
[73] Assignee Pitney-Bowes, Inc.
 Stamford, Connecticut
 a corporation of Delaware

[54] TIME DELAY
 10 Claims, 4 Drawing Figs.
[52] U.S. Cl. .................................... 137/612.1;
 251/47, 251/55, 251/61.1
[51] Int. Cl. .................................... F16k 7/17,
 F16k 31/165, F16k 47/10
[50] Field of Search ..................... 251/48, 55,
 47, 61.1; 137/608, 612.1

[56] References Cited
UNITED STATES PATENTS
| | | | |
|---|---|---|---|
| 1,923,127 | 8/1933 | Veenschoten ............... | 251/61X |
| 2,026,056 | 12/1935 | Omsted ....................... | 251/61.1X |
| 2,516,247 | 7/1950 | Nvenemann ............... | 251/48X |
| 3,052,064 | 9/1962 | Kaeser ........................ | 251/61.1X |

Primary Examiner—Arnold Rosenthal
Attorneys—William D. Soltow, Jr., Albert W. Scribner and Martin D. Wittstein ABSTRACT: A device for providing a variable time delay between the incoming and outgoing signals of a flow control device. The time delay utilizes a bellows which is actuated by an input signal to the flow control device to connect the supply passage of a sensor to the output signal passage of said sensor whereby the output signal from the sensor is initiated a short time after the initiation of the input signal to the flow control device. The time delay between initiation of said signals may be varied by adjustment of a variable restrictor in the fluid conduit line to the bellows or by varying the relative position of the bellows and the sensor.

Patented Dec. 1, 1970 3,543,792

INVENTOR.
ROBERT F. O'KEEFE
BY
*Albert W. Scribner*
ATTORNEY 3,543,792

TIME DELAY

BRIEF SUMMARY

This invention relates generally to fluid actuated control devices and more particularly to such devices in which the condition of flow of one fluid stream is utilized to control the condition of flow of another fluid stream. In the art of fluidics and fluid actuation many different types of control devices have been developed for controlling the condition of fluid flow in a flow line, such devices including both pure fluidic elements and fluid pressure or flow-responsive control devices. Heretofor there has been a lack of an efficient, low-cost and reliable means for providing such control devices with a variable time delay capability whereby the initiation of an output signal may be delayed with respect to the initiation of a first fluid signal. The present invention contemplates providing a new and improved flow control device which includes a very simple and direct means for providing an accurate time delay between the input signal to the control device and the output signal therefrom, and wherein the time relationship between such input and output signals may be easily and quickly varied at will.

The principles of the present invention reside in the provision of an expandable cylinder or bellows, a sensor means having an outlet passage that is adapted to be controlled by an expanded condition of said bellows, and a flow control device that is adapted to control the flow of fluid to and from said chamber or bellows.

The principal object of the instant invention is to provide a new and improved flow control device in which a time delay is provided between the initiation of an input signal thereto and the initiation of an output signal therefrom.

Another object of the present invention is to provide a novel time delay system wherein a bellows device is inflated relatively slowly and is deflated relatively rapidly.

Another object of the present invention is to provide a new and improved fluid-type time delay control device whereby the time relationship between the input signal and the output signal may be easily and quickly varied at will.

Other objects and advantages of the invention will be apparent from the following description taken in connection with the accompanying drawings. It will be understood that changes may be made in the details of construction and arrangement of parts shown and described without departing from the spirit of the invention as set forth in the accompanying claims, as the preferred form of the invention has been given by way of illustration only.

Referring to the drawings.

Figure 2:
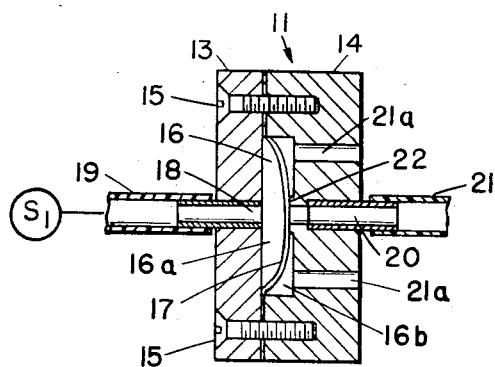
FIG. 2 is an axial sectional view of the isolator portion of the apparatus shown in FIG. 1.

Referring more particularly to the drawings wherein similar reference characters designate corresponding parts throughout, the flow control device shown embodying the invention is contained in the housing or frame 9 and generally includes an expandable bellows unit 10, a fluid isolator unit 11, and a a sensor means 12. Each of these three main portions of the instant device will be discussed in detail first and then a description of the overall construction and operation will be made. Referring first to FIG. 2 the flow control isolator 11 comprises two body elements 13 and 14 that are mutually secured together by screws 15. The mutually facing portions of said body elements are formed so as to cooperatively define a chamber 16. A resilient diaphragm 17 is sealingly interposed between the adjacent faces of the body elements 13 and 14 so as to divide said chamber into two parts each isolated from the other. The left side 16a of chamber 16 is operatively coupled to a source $S_1$ of pressure fluid through a suitable fitting 18 and tube 19, said source $S_1$ comprising any suitable control means such as a fluid amplifier. The right side 16b of said chamber 16 is operatively coupled through a suitable fitting 20 and a fluid supply tube 21 to the adjacent end of the bellows 10. The fitting 20 is disposed in substantial coaxial alinement with the fitting 18 in body element 13. The body element 14 is provided with a raised annular lip 22 surrounding the central outlet from chamber side 16b so as to assure good sealing contact with the diaphragm 17 when the latter is deflected thereto. The body element 14 is also provided with "quick-dump" vent holes 21a which communicate with the adjacent side 16b chamber 16 to allow quick fluid exhaust from chamber portion 16b.

Figure 1:
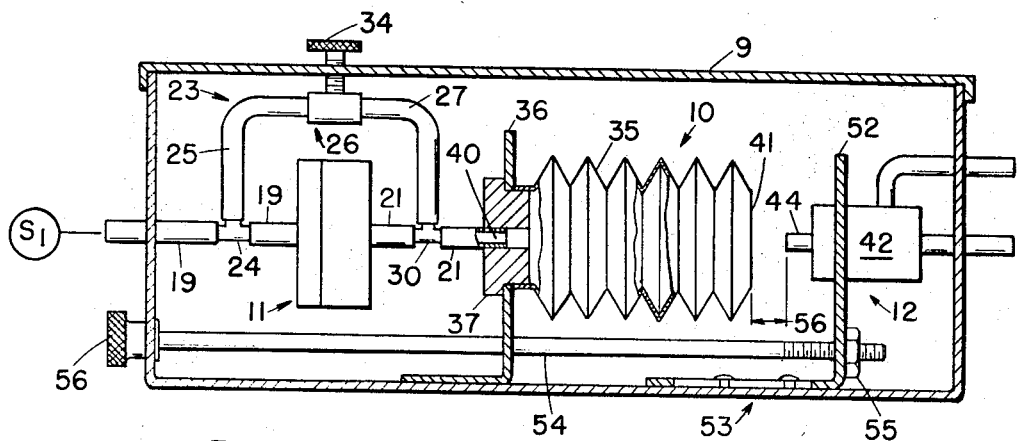
FIG. 1 is a front elevational view in partial section of a flow control device embodying the principles of the present invention.
Figure 4:
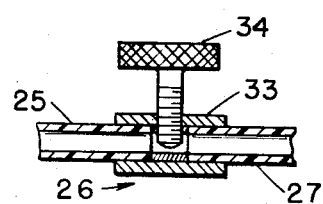
FIG. 4 is an axial sectional view of the variable fluid flow restriction unit shown in FIG. 1.

The said tubes 19 and 21 are interconnected by a bypass means 23, FIG. 1, which comprises a first T fitting 24, a tube 25, a restriction means 26, a tube 27 and a second T fitting 30, said fittings 24 and 30 being suitably interposed in the tubes 19 and 21 respectively. The restriction means 26 is shown in more detail in FIG. 4 and comprises a tubular body member 33 to which is connected, by any suitable means, fluid-conducting tubes 25 and 27 and in which is threaddedly mounted a needle valve member 34. As will be apparent the needle valve member 34 may be manually adjusted so as to controllably vary the effective cross-sectional area of the fluid-conducting passage through said restriction means 26.

Figure 3:
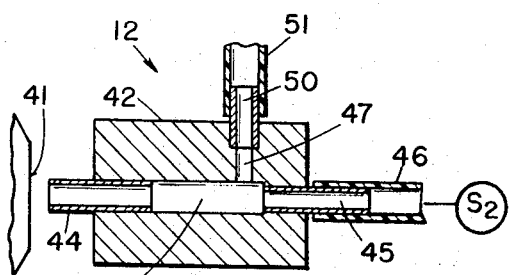
FIG. 3 is an axial sectional view of the sensor means of the apparatus of FIG. 1.

Between sensor means 12 and isolator 11 there is provided bellows 35 which is preferably made of plastic material or other resilient material and which is mounted at its left end, FIG. 2, on the frame 9 by means of a suitable supporting frame bracket 36 and an end sealing cap 37. The left end of bellows unit 10 as seen in FIG. 1 is operatively coupled through a suitable fitting 40 to said tube 21. The right-hand end 41 of the bellows 35 is closed and faces the sensor means 12. The sensor means 12 is of the back pressure type and, as illustrated in FIG. 3, comprises a body member 42 that is formed with a passage 43 therethrough. The opposite ends of body member 42 are provided with suitable fittings 44 and 45 respectively; the fitting 45 being operatively connected to a second source $S_2$ of fluid pressure through a tube 46. The body member 42 is also formed with a passage 47 which communicates at its inner end with said passage 43 and, through a suitable fitting 50, is operatively coupled at its outer end to a signal output tube 51. The sensor means 12 is mounted by any suitable means on a bracket 52 that is in turn slidably mounted on the frame 9 by any suitable means such as a pin and slot arrangement illustrated at 53 of FIG. 1. The position of bracket 52, and hence of the sensor means 12, may be adjusted by means of an adjustment screw 54 that is rotatably mounted at its left end, as seen in FIG. 1, on the frame 9 and is threaddedly engaged at its right end with the bracket 52. A locknut 55 secures the bracket 52 in the desired adjusted position as determined by the manual rotation of the enlarged outer end 56 of said bolt 54. As the bellows 35 is inflated the closed right-hand end 41 thereof will be extended and will ultimately engage and thus block the outer end of the tube 44 of the sensor means 12. As will be apparent when fluid pressure is supplied to the tube 46 of the sensor means a fluid exhaust will normally occur through tube 44; however when the end of tube 44 is blocked by the extended bellows end 41 a fluid exhaust will then take place through the output tube 51 of the sensor means 12.

The instant device is adapted to receive an input signal from source $S_1$, and to generate, a predetermined time later, an output signal in tube 51. An overall description of the operation of the instant apparatus to produce this time delay function will now be made. The normal condition of the sensor means 12 is such that fluid continuously flows from the pressure source $S_2$ through the sensor means 12 and normally exhausts through tube 44; the longitudinally extendable bellows 12 remaining in its relaxed or retracted condition shown in FIG. 1 when no fluid flow is received through the tube 19 of the isolator 11. Under these conditions the springlike action of the bellows 35 itself tends to retain said bellows in its longitudinally contracted condition so that a predetermined length gap 56 exists between the bellows end 41 and the outer end of said tube 44. When the bellows ends 41 is displaced to the right and reaches and blocks the adjacent end of tube 44 the fluid pressure continuously supplied from source $S_2$ will commence to exhaust from the output tube 51 of the sensor means. The length of time that it takes to inflate the bellows 35 to an extent sufficient to cause the bellows end 41 to move from its normal FIG. 1 position to its said blocking position represents the time delay between the initiation of the fluid pressure signal from source $S_1$ and the initiation of the output signal or fluid exhaust flow from said tube 51. The fluid output flow from said tube 51 will continue for as long as the input signal from source $S_1$ maintains the bellows in its extended condition. When the signal from source $S_1$ terminates the diaphragm 17 will move to its normal relaxed condition away from said rim 22 so that the inflated bellows may be quickly exhausted through the vent holes 21a. This "quick-dumping" action of the isolator 11 will cause the bellows 35 to be rapidly deflated so that the closed end 41 thereof is quickly restored to its normal FIG. 1 retracted position and thus the fluid output flow from tube 51 ceases and the normal exhaust flow from the sensor means 12 is reestablished through the tube 44. The device is thus quickly restored to its said normal condition.

It will be seen that the time between the initiation of the input signal to the flow control device or isolator 11 and the initiation of the output signal from the sensor 12 may be varied by varying the distance between the bellows 35 and the sensor means 12 to thereby adjust the normal gap between the bellows end 41 and the outer end of tube 44, and/or by varying the setting of the restriction screw 34 in the bypass line 23 to thereby vary the rate of inflation of the bellows by fluid pressure from signal source $S_1$. It will be noted that either or both of these adjustments may be utilized to variably set the time delay that is to be generated by the instant arrangements.

The construction and operation of the device is believed apparent from the foregoing description from which it will be seen that new and improved means has been provided for obtaining all of the objects and advantages of the invention.

I claim:

1. A fluid operated time delay device comprising:
   a frame;
   an extendable fluid container means carried by said frame and adapted to be inflated so as to have one operative portion thereof displaced;
   an isolator means carried by said frame and having a first passage means adapted to control the flow of fluid to said container means and second passage means through which fluid from the inflated container means may be quickly exhausted; and
   sensor means carried by said frame and having two fluid exhaust means that are adapted to be selectively operatively controlled by said operative portion of said container means for controlling the fluid exhaust output flow from said sensor means in accordance with the position of said displaceable portion of said container means whereby a time delay will occur between the initiation of flow through said first passage means of said isolator means and the initiation of flow through the selected exhaust means of said sensor means.

2. Apparatus as defined by claim 1: additionally comprising means for varying the operative normal distance between said container means and said sensor means.

3. Apparatus as defined by claim 1 wherein said first passage means of said isolator means includes a restriction means for controlling the rate at which said container means may be inflated.

4. Apparatus as defined by claim 1 wherein said container means comprises a resilient bellows, and wherein the movable end of said bellows is adapted to engage and control the operation of said sensor means.

5. Apparatus as defined by claim 1 wherein said container means comprises a longitudinally extendable bellows having a movable outer end that is adapted when displaced to block off one of said fluid exhaust means of said sensor means.

6. Apparatus as defined by claim 5 wherein said first passage means of said isolator means includes a variable fluid flow restriction means for controlling the rate at which said bellows is inflated.

7. Apparatus as defined by claim 5: additionally comprising means carried by said frame for varying the normal operative distance between the said operative displaceable end of said bellows and the said one fluid exhaust means of said sensor means.

8. A fluid operated time delay device comprising:
   a frame;
   an expandable container;
   mounting means for mounting said container on said frame so that one end of said container is free to move, said free end being yieldably urged towards a normal retracted position;
   a fluid control device having a passage therein for receiving a fluid flow signal and for conducting said signal to said expandable container so as to produce a displacement of said free end of said container;
   a sensor means adapted to be controlled by the said free end of said container whereby when said free end is displaced into cooperative relation with respect to said sensor means the latter will initiate an output signal, a predetermined time delay thereby being produced between the time of initiating said fluid flow signal in said passage of the control device and the time of initiating of an output signal from said sensor means; and
   quick exhaust valve means controlled by said fluid flow signal and operable to permit a relatively fast deflation of said container upon the effective termination of said fluid flow signal.

9. Apparatus as defined by claim 8: additionally comprising variable fluid flow restriction means for adjustably controlling the rate at which said container is inflated.

10. Apparatus as defined by claim 8: additionally comprising mounting means for adjustably varying the relative normal positions of said container and said sensor means.